March 18, 1941. W. B. MARSHALL 2,235,459
METHOD OF AND APPARATUS FOR REMOVING INORGANIC SOLIDS FROM LIQUIDS
Filed March 13, 1939 3 Sheets-Sheet 1
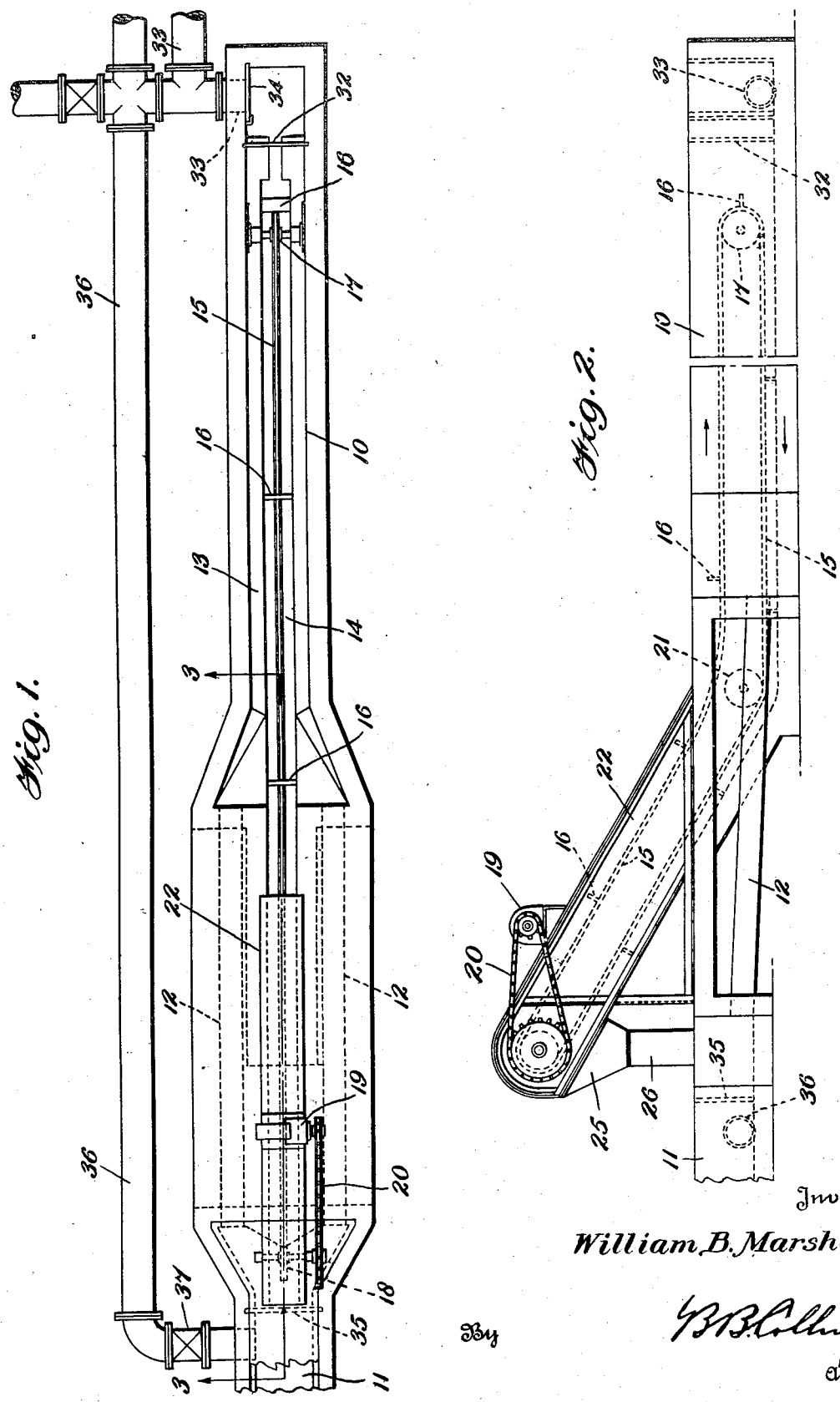
Inventor
William B. Marshall,
By B.B.Collings
Attorney March 18, 1941.  W. B. MARSHALL  2,235,459
METHOD OF AND APPARATUS FOR REMOVING INORGANIC SOLIDS FROM LIQUIDS
Filed March 13, 1939  3 Sheets-Sheet 2
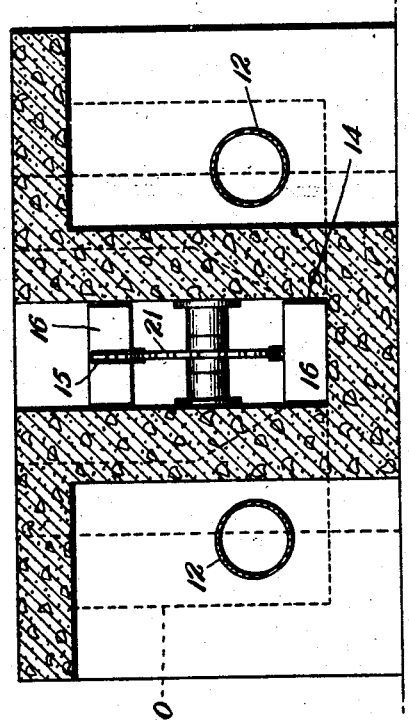
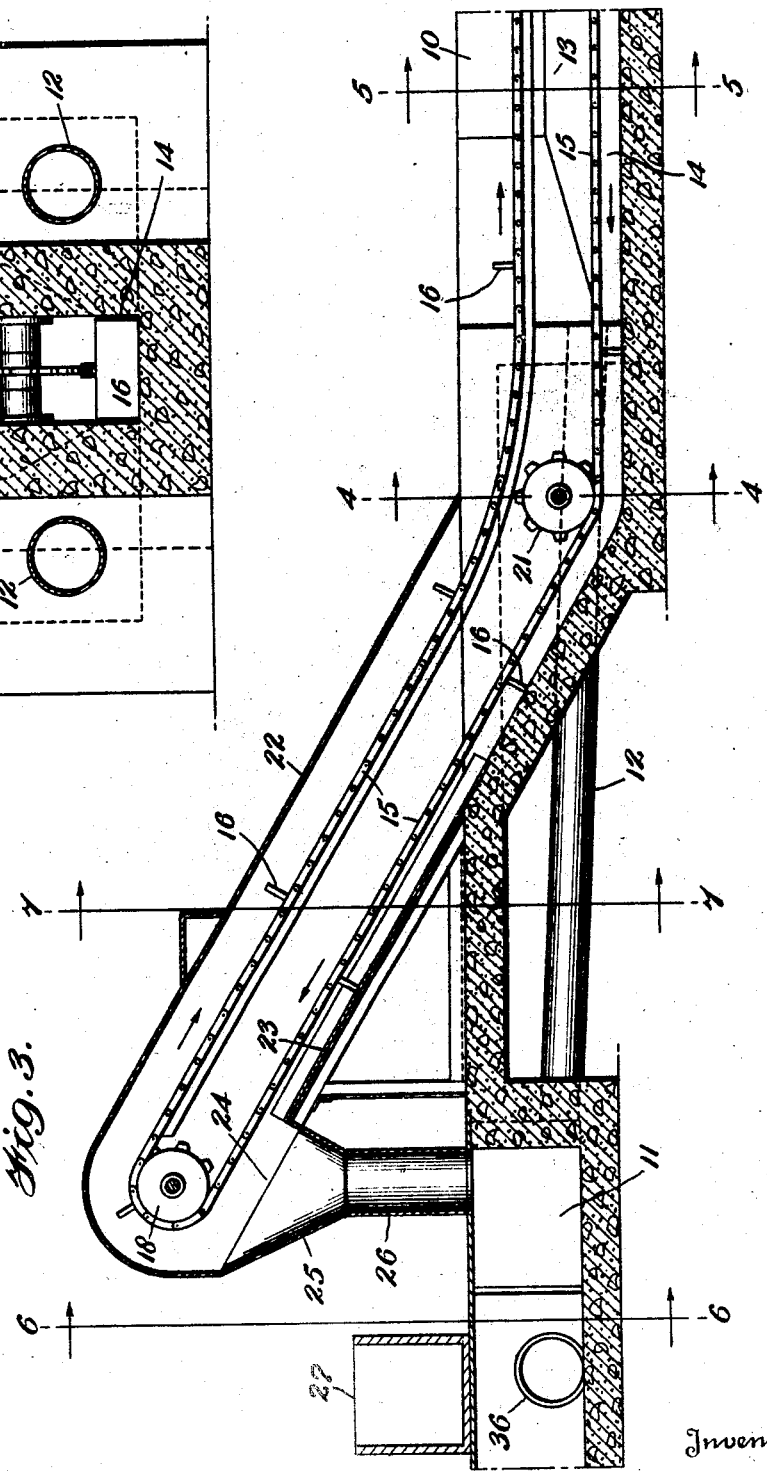
Inventor
William B. Marshall,
By
B. B. Collings
Attorney March 18, 1941.   W. B. MARSHALL   2,235,459
METHOD OF AND APPARATUS FOR REMOVING INORGANIC SOLIDS FROM LIQUIDS
Filed March 13, 1939   3 Sheets-Sheet 3
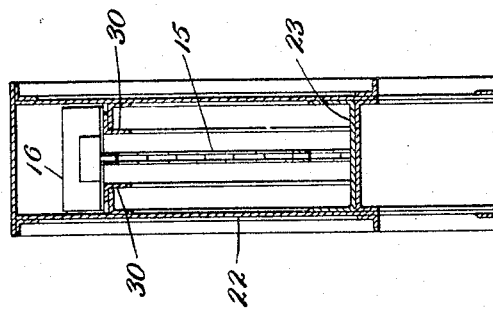
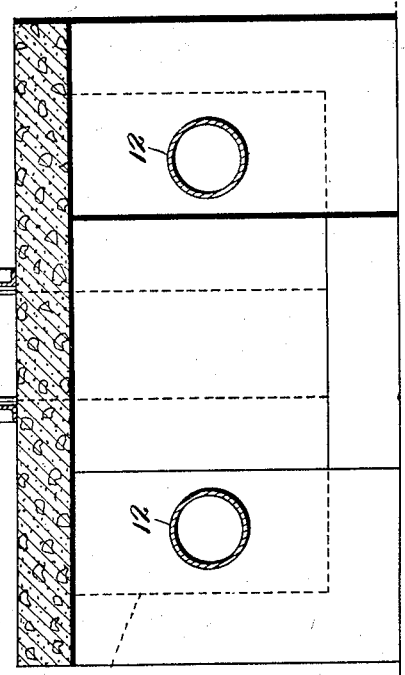
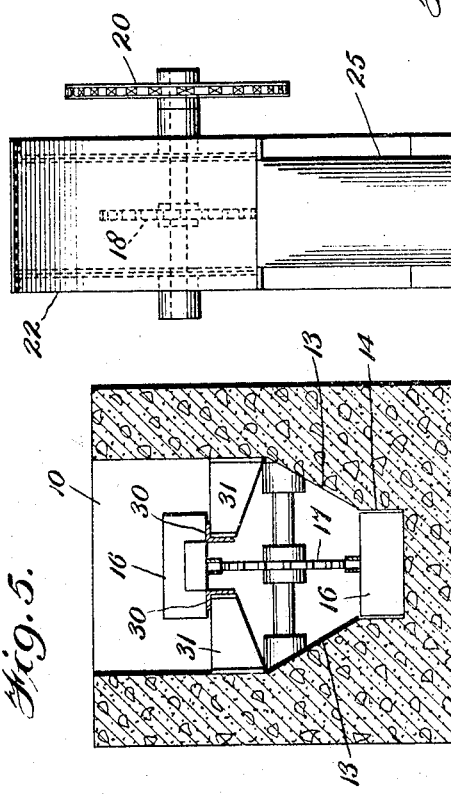
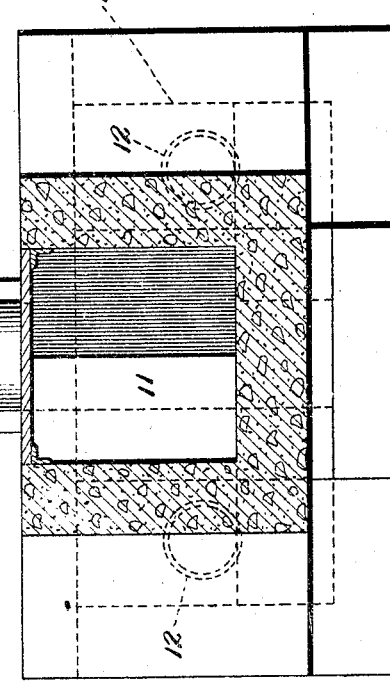
Inventor
William B. Marshall,
By B. B. Collings
Attorney Patented Mar. 18, 1941

2,235,459

UNITED STATES PATENT OFFICE 2,235,459

METHOD OF AND APPARATUS FOR REMOVING INORGANIC SOLIDS FROM LIQUIDS

William B. Marshall, Milwaukee, Wis., assignor to Chain Belt Company, Milwaukee, Wis., a corporation of Wisconsin Application March 13, 1939, Serial No. 261,644

7 Claims. (Cl. 210—3)

The invention relates to a method of and apparatus for removing inorganic solids from liquids, and has for one of its objects to provide a simple and effective process and apparatus for separating and removing grit and similar inorganic solids from liquids carrying both organic and inorganic solids in suspension, such for example as sewage.

In order that the precise nature of the invention may be the better understood, it may be said that in present day practice it is customary to separate and remove as far as possible the inorganics contained in sewage liquids before passing these liquids into the settling tanks where the organic solids are permitted to settle and recovered as primary sludge. This preliminary separation of the grit and/or other inorganics is ordinarily accomplished by causing the sewage to flow through grit chambers of suitable length and of a cross sectional area designed to secure a velocity of flow of approximately 1 foot per second, this velocity having been found from experience to be the best suited to permit the heavier inorganics to settle while retaining the lighter organics in suspension.

While the importance of this velocity of flow is well recognized by those skilled in the art, in actual practice it is extremely difficult, if not impossible, to maintain it with any fair degree of constancy. Sewage volume varies materially from day to day, as well as from hour to hour in any given day, usually being much greater in the day time than at night. There is also a seasonal variation, summer flow being different from winter, and spring flow different from that in the fall. Should the sanitary sewers on occasion also carry storm water, or be poorly laid so as to permit infiltration of surface water, the volume, and consequently the velocities through the grit chambers, may also be affected.

With these numerous variable factors present, maintenance of a uniform velocity of flow through the grit chambers is practically impossible in small single unit installations. In large multiple unit plants, where one or more units may be cut in or out of use to control the velocity in accordance with varying conditions, the problem is to some extent one of operation. However, in small plants where only a single unit is necessary to handle the maximum flow requirements, nothing of that kind may be done to improve the situation.

Even with nearly perfect velocity conditions there will be a certain amount of organic material carried down to the bottom of the grit chamber with the grit itself, and in recognition of this fact it is also established practice to provide grit washers designed to agitate the grit after it has been removed from the bottom of the chamber, and in this way loosen the organics therefrom so that they may be returned to the sewage flow beyond the grit chamber and passed into the settling tanks for recovery as primary sludge. To this end, in the more modern sewage treatment plants, the grit chambers are provided with mechanical means for evacuating the grit from the chambers, which means may take the form of scraper or bucket conveyers, sometimes combined with a screw conveyer. Frequently a separate washing system is installed for washing the organics out of the removed grit. This washing can be accomplished in a satisfactory manner where there is a reasonable proportion of grit and a relatively smaller proportion of organic material, but in many cases, the velocity of flow is well below the desired velocity of one foot per second, as night flow, and at other periods the sewage may carry a greater quantity of the heavier organics than normal, as during the early morning flow, and under such conditions, circumstances are not always suitable for the removal of the organics by the employment of washing means.

In recognition of these problems and difficulties, the present invention has for its primary object to provide a simple method of treating or handling sewage and similar liquids carrying organic and inorganic solids in suspension, particularly although not solely adapted for use in small single unit installations, whereby the inorganics may be effectively segregated and removed from the liquid and organics without any attempt at manual or automatic control of volume or velocity conditions.

A further object of the invention is to provide an apparatus especially suited for carrying out such method.

With the above and other objects in view, which will appear as the description proceeds, the invention consists in the novel steps and combinations of steps constituting the method, and in the novel details of construction and combinations of parts constituting the apparatus, all as will be more fully hereinafter described and particularly pointed out in the appended claims.

Referring to the accompanying drawings forming a part of this specification, in which like reference characters designate like parts in all the views:

Figure 1 is a top plan view of a grit chamber and associated apparatus constructed and arranged in accordance with the invention, and suitable for carrying out the improved method;

Fig. 2 is a side elevational view, partly broken away, of the parts shown in Fig. 1;

Fig. 3 is an enlarged longitudinal sectional view of the left hand portion of the apparatus shown in Figs. 1 and 2, taken approximately on the plane indicated by the line 3—3 of Fig. 1, looking in the direction of the arrows;

Fig. 4 is a cross sectional view, still further enlarged, taken approximately on the plane indicated by the line 4—4 of Fig. 3; and Figs. 5, 6 and 7 are similar cross sectional views, taken respectively on the planes indicated by the lines 5—5, 6—6, and 7—7 of Fig. 3 looking in the direction of the arrows.

In my attempts to find a solution to the above indicated difficulties and to make a definite improvement in the art, I have taken cognizance of the fact that material of either organic or inorganic nature requires far greater velocity to remove it from the bottom of the chamber, once it is settled there, than is required to keep it in suspension if it is already in the flowing stream. This point has been given recognition in literature on this subject and an eminent authority (Metcalf and Eddy) states that thirty to forty times the velocity is required to pick up material that is lodged on the bottom, over the velocity required to transport it when it is actually in suspension. Keeping this point in mind, I have differentiated between ineffective attempts to stir up material lodged on the bottom and the true value of placing this undesirable organic material in suspension where it can receive the benefit of transportation in the sewage flow.

With this in mind, rather than attempt any washing of this material which oftentimes contains an insignificant amount of inorganic material, I have conceived the value of removing this deposited material in its entirety and returning it to the top of the sewage flow where it can receive the full benefit of the transporting velocity of this flow. When this return of the bottom deposited material is made at the head end of such a grit chamber, in all likelihood the organic material will be carried through to its logical point of deposition, namely, the settling tanks, where it can be removed as primary sludge; and inorganic material in this bottom deposited matter, if any, can again receive the benefit of velocity separation in the grit chamber. In making this return, I make no attempt to separate organic or inorganic material one from the other before deposition back in the sewage flow, but depend upon the re-separation of this material by again utilizing the one foot per second velocity in the channel for this purpose.

In actual practice this transferring method receives the advantage of far more favorable velocity conditions when the transfer is to be effected because, while the deposition ordinarily takes place during low night flows, it is more convenient in practice to remove this material by the mechanical means provided in the grit chamber and make the transfer back to the top of the sewage flow some time during day light hours when the operator is present and on duty at the sewage plant. At such time the normal volume of sewage flow is considerably greater than during the low night flows when the deposition took place. Accordingly this practice not only allows the re-circulation of all the material for better separation by transferring it from bottom to top velocities in the sewage flow, but it also provides for the making of such a transfer under convenient circumstances when the conditions for doing such work and making such transfer have considerably improved.

Accordingly, the present process comprises essentially permitting the settled solids, both organic and inorganic, to accumulate in the grit chamber, through failure to remove them, during periods (as at night) when the flow velocity therein is materially below one foot per second; and in subsequently, when the sewage volume has increased sufficiently to restore the flow velocity in the grit chamber to approximately one foot per second, removing the accumulation of deposited organics and inorganics and returning them, without any attempt at separation or washing, to the flowing stream of raw sewage before it enters the grit chamber. The solids are thus re-suspended in the stream and again enter the grit chamber, but this time under the conditions most favorable to the settling of the inorganics and the carrying of the organics on with the liquid to the settling tanks. As a result, the grit again settles to the floor of the grit chamber, but this time substantially free from organics, and it can be recovered and disposed of in most cases without separate washing or further treatment.

The process is susceptible of being carried out by a variety of apparatus, but one form which I have found particularly suitable is illustrated in the accompanying drawings.

In the said drawings, 10 indicates a grit chamber, here shown as constructed of concrete as is customary in the art, which is arranged to receive the sewage or other solids-carrying liquid from a conduit 11 by means of a pair of pipes 12. The chamber 10 is of such cross sectional area as to produce a flow velocity of approximately 1 foot per second when the volume of liquid reaches the average maximum condition, and the said chamber is of such length as to insure the substantially complete settling of the maximum quantity of inorganic solids likely to be encountered. The chamber 10 throughout most of its length is preferably of the cross section shown in Fig. 5, with the lower portions of its side walls sloping inwardly, as at 13, to a medial channel or trough 14. A conveyer, here shown as comprising an endless chain or belt 15 provided with transverse flights or scrapers 16, is mounted in the chamber, with the chain being trained about a tail sprocket 17 and a head sprocket 18, the latter of which may be driven from a motor 19 by a chain and sprocket drive 20. The conveyer travels in the direction indicated by the arrows in Fig. 2, with the flights or scrapers 16 traversing the trough or channel 14 from right to left on the lower run. The head end of the conveyer is inclined upwardly, as shown in Figs. 2 and 3, with the chain 15 passing about an idler sprocket 21 located at the beginning of the incline, and the said head end is preferably enclosed within a suitable housing 22. The bottom of this housing may be provided with a renewable wear plate 23 (see Figs. 3 and 7) and its upper end has a discharge opening 24 communicating by means of a funnel section 25 and a removable pipe section 26 with the supply conduit 11 just ahead of the intake of the pipes 12.

The upper run of the conveyer may be supported by the longitudinally extending rails or angles 30 supported from the walls of the chamber 10 by brackets 31 (see Fig. 5) and these rails continue upwardly in the housing 22 to adjacent the head sprocket 18, being supported by the side walls of the housing.

The chamber 10 is provided with a weir 32 adjacent its outlet end, by means of which the height of the liquid in the chamber may be controlled; and an outlet pipe 33 communicates with this end of the chamber to conduct the liquid and organics to the settling tank or elsewhere, as may be desired. The intake of this pipe may be controlled by a stop board 34, and the conduit 11 is also provided with a similar board 35, whereby the chamber may be cut off in case of necessity for repairs or other purposes. A by-pass pipe 36 controlled by a valve 37, communicates with the conduit 11 ahead of this stop board, through which the sewage may be by-passed around the chamber when necessary.

In carrying out the process with this apparatus, at night or during other periods when the flow velocity falls below one foot per second so that a relatively large percentage of organics will settle in the chamber 10, the conveyer 15 is not operated, and the settling solids, both organic and inorganic, are allowed to accumulate on the floor of the chamber. When the sewage volume increases so as to restore the velocity through the chamber to one foot per second, the motor 19 is started and the conveyer operated to cause its flights 16 to scrape the solids toward the left, as viewed in Figs. 1-3, up the incline, thereby removing them from the liquid within the chamber 10. The conveyer discharges the solids through the opening 24 to the funnel 25, and they are directed by the pipe section 26 to the top of the stream of raw sewage in the conduit 11, to be re-suspended therein and again conducted through the pipes 12 to the chamber 10. This time they have the benefit of the most favorable conditions for separation, and the grit settles to the chamber floor while substantially all of the organics are carried by the liquid over the weir 32 to the discharge pipe 33, which conducts them to the settling tanks.

After all of the accumulated solids have been removed and re-deposited in the sewage stream in conduit 11, the pipe section 26 may be removed and a suitable receptacle 27 placed beneath the funnel 25 to receive the clean grit, which may be disposed of as desired.

While it has been pointed out that this process contributes particularly to the improvement of operating conditions in small single unit installations, it is also applicable to larger multiple unit plants, where it may eliminate or reduce by an appreciable extent the precision necessary in controlling the velocities therein. It is therefore to be distinctly understood that the invention is by no means limited to the smaller installations.

It is obvious that those skilled in the art may vary the precise steps constituting the method, as well as the details of construction and precise arrangement of parts constituting the apparatus, without departing from the spirit of the invention, and therefore it is not wished to be limited to the above disclosure except as may be required by the claims.

What is claimed is:

1. The method of segregating and removing inorganic solids from a liquid containing organic and inorganic solids in suspension and subject to variable flow conditions, which method comprises passing said liquid through a settling zone normally at a velocity best suited to cause said inorganics to settle therein while maintaining said inorganics in suspension, said velocity however being subject to reduction below said normal due to variations in said flow conditions, during which periods both organics and inorganics will settle in said zone; removing from the zone the inorganics which settle therein during normal velocity periods; and recirculating through the zone at said normal velocity all of the organics and the inorganics which settle therein during sub-normal velocity periods, whereby such inorganics may re-settle while the organics will be maintained in suspension and carried through the zone.

2. The method of segregating and removing inorganic solids from a liquid containing organic and inorganic solids in suspension and subject to variable flow conditions, which method comprises passing said liquid through a settling zone normally at a velocity best suited to cause said inorganics to settle therein while maintaining said organics in suspension, said velocity however being subject to reduction below said normal due to variations in said flow conditions during which periods both organics and inorganics will settle in said zone; removing from the zone the inorganics which settle therein during normal velocity periods; retaining in the zone the organic and inorganic solids which settle therein during said sub-normal velocity periods; and recirculating said retained organic and inorganic solids through said zone when flow conditions restore the velocity of the liquid therein to said normal, whereby said inorganics may resettle in the zone while the organics will be carried through.

3. The method of segregating and removing inorganic solids from a liquid containing organic and inorganic solids in suspension and subject to variable flow conditions, which method comprises passing said liquid through a settling zone normally at a velocity best suited to cause said inorganics to settle therein while maintaining said organics in suspension, said velocity however being subject to reduction below said normal due to variations in said flow conditions, during which periods both organics and inorganics will settle in said zone; removing from the zone the inorganics which settle therein during normal velocity periods; re-suspending in the liquid precedent the zone all of the organic and inorganic solids which settle therein during said sub-normal velocity periods; and then subjecting such re-suspended solids to normal velocity action in said zone, whereby the inorganics may re-settle therein while the organics will be carried through.

4. The method of segregating and removing inorganic solids from a liquid containing organic and inorganic solids in suspension and subject to variable flow conditions, which method comprises passing said liquid through a settling zone normally at a velocity best suited to cause said inorganics to settle therein while maintaining said organics in suspension, said velocity however being subject to reduction below said normal due to variations in said flow conditions, during which periods both organics and inorganics will settle in said zone; removing from the zone the inorganics which settle therein during normal velocity periods; and removing the organic and inorganic solids which settle in said zone during said subnormal velocity periods and depositing them in the line of flow of the liquid adjacent the influent end of said zone when flow conditions restore the flow velocity in the zone to normal, whereby such solids may be re-suspended in said liquid and returned to said zone, where they are subjected to normal velocity action to cause the inorganics to re-settle and said organics to be carried through.

5. The method of segregating and removing inorganic solids from a liquid containing organic and inorganic solids in suspension and subject to variable flow conditions, which method comprises passing said liquid through a settling zone normally at a velocity best suited to cause said inorganics to settle therein while maintaining said organics in suspension, said velocity however being subject to reduction below said normal due to variations in said flow conditions, during which periods both organics and inorganics will settle in said zone; removing from the zone the inorganics which settle therein during normal velocity periods; retaining in the zone during sub-normal velocity periods the organic and inorganic solids which settle therein during such periods; and transferring all of the organics and inorganics so retained to the top of the liquid precedent the zone when flow conditions restore the flow velocity in the zone to normal, whereby such solids may be re-suspended in the liquid and returned to the zone to be subjected to normal velocity action therein to cause said inorganics to re-settle and said organics to be carried through.

6. In apparatus for segregating and removing inorganic solids from a stream of liquid containing organic and inorganic solids in suspension and subject to variable flow conditions, a settling chamber through which said liquid may be passed at velocities dependent upon said flow conditions up to a normal velocity at which said inorganics will settle while said organics will be carried through, and below which both the organic and inorganic solids will settle; a conduit for supplying the solids-carrying liquid to said chamber to produce said normal velocity therein under normal flow conditions; and means for removing from the liquid in said chamber the inorganic solids which settle therein during normal velocity periods in the chamber, and for removing and returning to the liquid in the conduit both the organic and inorganic solids which settle in the chamber during sub-normal velocity periods therein, whereby they may be re-suspended in said liquid and then subjected to normal velocity action in the chamber to cause the inorganics to re-settle and the organics to be carried through.

7. In apparatus for segregating and removing inorganic solids from a stream of liquid containing organic and inorganic solids in suspension and subject to variable flow conditions, a settling chamber through which said liquid may be passed at variable velocities dependent upon said flow conditions, said chamber having a cross sectional area which under normal flow conditions will produce therein a normal velocity at which said inorganics will settle while said organics will be carried through, and below which both the organics and inorganics will settle; a conduit for supplying the solids-carrying liquid to said chamber under variable flow conditions up to said normal; conveyer means for removing from the liquid in the chamber the inorganics which settle therein during normal velocity periods, as well as the organics and inorganics which settle during sub-normal velocity periods; and means whereby said last named solids may be returned to and re-suspended in the liquid stream precedent the chamber for subjection therein to normal velocity action to cause the inorganics to re-settle and the organics to be carried through.

WILLIAM B. MARSHALL.